US012456832B2

(12) United States Patent
Miyamura

(10) Patent No.: US 12,456,832 B2
(45) Date of Patent: Oct. 28, 2025

(54) CARD EDGE CONNECTOR WITH A CONNECTION TERMINAL INCLUDING A RESILIENT CONTACT PIECE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tetsuya Miyamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 337 days.

(21) Appl. No.: 18/022,009

(22) PCT Filed: Jul. 30, 2021

(86) PCT No.: PCT/JP2021/028320
§ 371 (c)(1),
(2) Date: Feb. 17, 2023

(87) PCT Pub. No.: WO2022/049948
PCT Pub. Date: Mar. 10, 2022

(65) Prior Publication Data
US 2023/0378673 A1 Nov. 23, 2023

(30) Foreign Application Priority Data
Sep. 7, 2020 (JP) ................................. 2020-149862

(51) Int. Cl.
*H01R 12/87* (2011.01)
*H01R 12/72* (2011.01)

(52) U.S. Cl.
CPC ........... *H01R 12/87* (2013.01); *H01R 12/721* (2013.01)

(58) Field of Classification Search
CPC .............................. H01R 12/87; H01R 12/721
(Continued)

(56) References Cited

U.S. PATENT DOCUMENTS 3,399,377 A * 8/1968 Warzecka ............ H01R 12/721 439/634
4,981,440 A * 1/1991 Werner ................ H01R 13/193 439/372
(Continued)

FOREIGN PATENT DOCUMENTS

DE 19508189 C2 * 7/1998 ........... H01R 13/193
DE 102008026390 B4 * 12/2011 ......... H01R 12/7005
(Continued)

OTHER PUBLICATIONS

International Search Report issued on Oct. 19, 2021 for WO 2022/049948 A1 (4 pages).

*Primary Examiner* — Peter G Leigh
(74) *Attorney, Agent, or Firm* — Venjuris, P.C.

(57) ABSTRACT

A card edge connector is provided with a housing, a receptacle to be mounted on an end part of a circuit board and fit to the housing, a connection terminal including a resilient contact piece to be brought into contact with a surface of the circuit board and a pressure receiving portion, and a pressure holding member to be mounted into the housing and including a pressing portion for pressing the pressure receiving portion. The receptacle includes an inclined portion, along which the pressure holding member is displaced to increase a pressing stroke of the pressing portion for the pressure receiving portion as the housing is further fit into the receptacle. The resilient contact piece is displaced toward a board accommodating portion for accommodating the circuit board and contacts the surface of the circuit board while pressing the surface of the circuit board as the pressing stroke increases.

6 Claims, 10 Drawing Sheets

(58) Field of Classification Search
USPC ............................................................ 439/59
See application file for complete search history.

(56) References Cited

U.S. PATENT DOCUMENTS

| | | | | | |
|---|---|---|---|---|---|
| 5,632,638 | A * | 5/1997 | Matsushita | .......... | H01R 12/721 439/260 |
| 7,666,015 | B2 * | 2/2010 | Sakamoto | ............ | H01R 12/721 439/260 |
| 2009/0004889 | A1 * | 1/2009 | Sakamoto | ............ | H01R 13/629 439/59 |
| 2018/0034177 | A1 * | 2/2018 | Enomoto | ............. | H01R 12/721 |

FOREIGN PATENT DOCUMENTS

| | | | | | |
|---|---|---|---|---|---|
| EP | 731528 | A1 * | 9/1996 | ........... | H01R 13/193 |
| JP | S54-095894 | U1 | 7/1979 | | |
| JP | H0722126 | A * | 1/1995 | ............. | H01R 13/15 |
| JP | H07142128 | A * | 6/1995 | ............. | H01R 12/87 |
| JP | H0837065 | A * | 2/1996 | ............. | H01R 24/00 |
| JP | H0837066 | A * | 2/1996 | ........... | H01R 13/629 |
| JP | 2000091004 | A * | 3/2000 | ............. | H01R 12/79 |
| JP | 2001230032 | A * | 8/2001 | ............. | H01R 24/00 |
| JP | 2011-100652 | A | 5/2011 | | |
| JP | 2012-243562 | A | 12/2012 | | |

* cited by examiner

CARD EDGE CONNECTOR WITH A CONNECTION TERMINAL INCLUDING A RESILIENT CONTACT PIECE

CROSS REFERENCE TO RELATED APPLICATIONS

This application is a national phase of PCT application No. PCT/JP2021/028320, filed on Jul. 30, 2021, which claims priority from Japanese patent application No. 2020-149862, filed on Sep. 7, 2020, all of which are incorporated herein by reference.

TECHNICAL FIELD

The present disclosure relates to a card edge connector.

BACKGROUND

Patent Document 1 discloses a card edge connector. This connector is formed with a slit-like region for the insertion of a board. A terminal includes a contact end part projecting from the outer surface of the terminal, and this contact end part is arranged to project into the slit-like region. If the board is inserted into this region, the contact end part resiliently contacts a surface of the board.

PRIOR ART DOCUMENT

Patent Document

Patent Document 1: JP 2012-243562 A

SUMMARY OF THE INVENTION

Problem to be Solved

The contact end part of the terminal waits in a state projecting into the region into which the board is inserted. Thus, in the process of inserting the board, the contact end part may be plastically deformed or damaged by an inserting end part of the board. If the contact end part is plastically deformed or damaged, connection reliability with the board is reduced.

A card edge connector of the present disclosure was completed on the basis of the above situation and aims to prevent a reduction in connection reliability.

Means to Solve the Problem

The present disclosure is directed to a card edge connector with a housing, a receptacle to be mounted on an end part of a circuit board, the receptacle being fit to the housing, a connection terminal including a resilient contact piece to be brought into contact with a surface of the circuit board and a pressure receiving portion for displacing the resilient contact piece in a direction toward the surface of the circuit board by being pressed, the connection terminal being mounted in the housing, and a pressure holding member to be mounted into the housing, the pressure holding member including a pressing portion for pressing the pressure receiving portion, the receptacle including a slope, the pressure holding member being displaced along the slope to increase a pressing stroke of the pressing portion for the pressure receiving portion as the housing is further fit into the receptacle, and the resilient contact piece being displaced toward a board accommodating portion for accommodating the circuit board and contacting the surface of the circuit board accommodated in the board accommodating portion while pressing the surface of the circuit board as the pressing stroke increases.

Effect of the Invention

According to the present disclosure, a reduction in connection reliability can be prevented.

DETAILED DESCRIPTION TO EXECUTE THE INVENTION

Description of Embodiments of Present Disclosure

Figure 1:
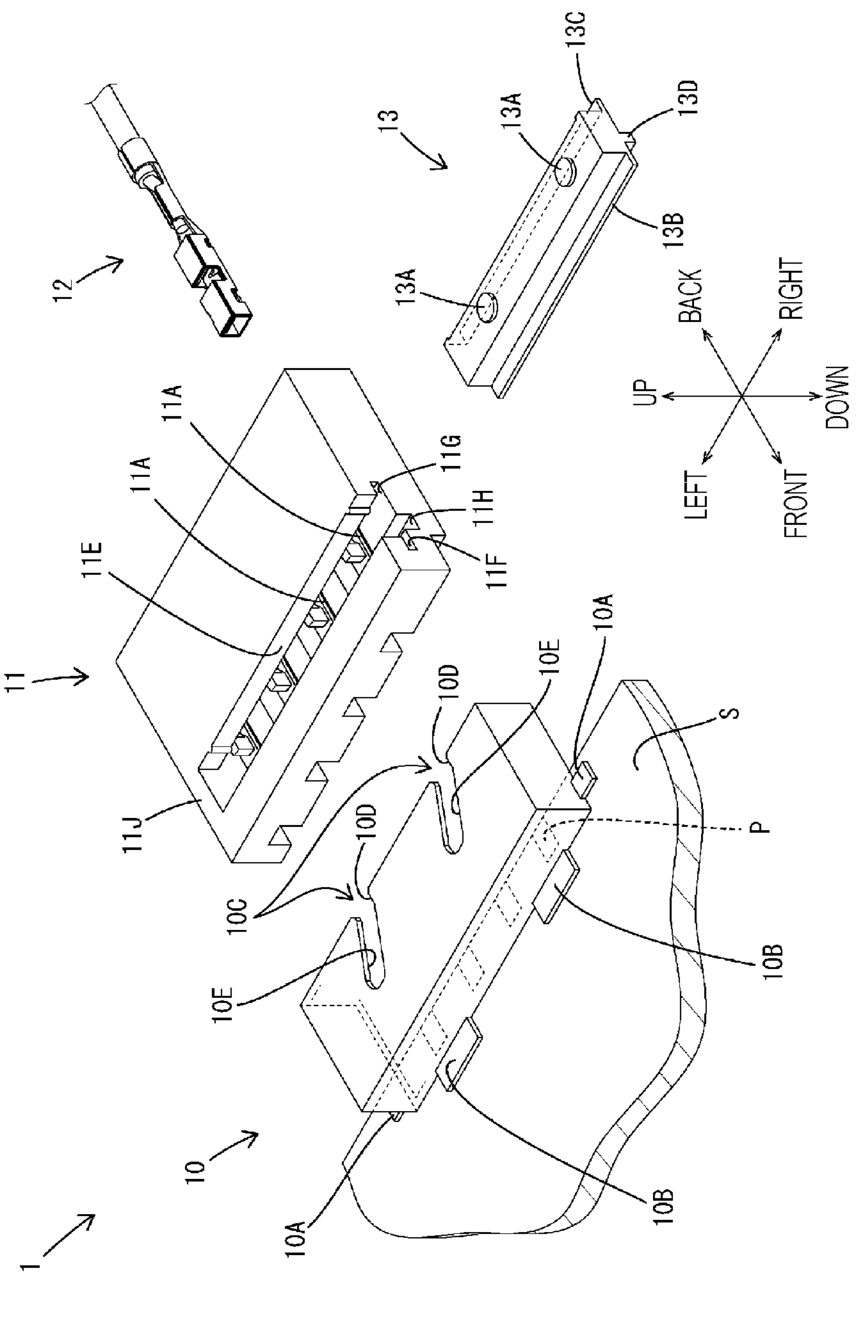
FIG. 1 is an exploded perspective view of a card edge connector.

First, embodiments of the present disclosure are listed and described.

(1) The card edge connector of the present disclosure is provided with a housing, a receptacle to be mounted on an end part of a circuit board, the receptacle being fit to the housing, a connection terminal including a resilient contact piece to be brought into contact with a surface of the circuit board and a pressure receiving portion for displacing the resilient contact piece in a direction toward the surface of the circuit board by being pressed, the connection terminal being mounted in the housing, and a pressure holding member to be mounted into the housing, the pressure holding member including a pressing portion for pressing the pressure receiving portion, the receptacle including a slope, the pressure holding member being displaced along the slope to increase a pressing stroke of the pressing portion for the pressure receiving portion as the housing is further fit into the receptacle, and the resilient contact piece being displaced toward a board accommodating portion for accommodating the circuit board and contacting the surface of the circuit board accommodated in the board accommodating portion while pressing the surface of the circuit board as the pressing stroke increases. According to this configuration, since the resilient contact piece is displaced toward the board accommodating portion in fitting the housing into the receptacle, it is possible to prevent the collision of an inserting end part of the circuit board with the resilient contact piece when the circuit board is inserted into the board accommodating portion, whereby the deformation of the resilient contact piece can be prevented.

(2) Preferably, the slope of the card edge connector of the present disclosure is a cam groove, and the pressure holding member includes a cam portion configured to be fit into the cam groove and move along the cam groove. According to this configuration, the pressure holding member can be moved along the slope by a simple structure.

(3) Preferably, the pressure receiving portion of the card edge connector of the present disclosure is provided with a catching portion for catching the pressing portion. According to this configuration, since the pressing portion can be caught by the catching portion, it can be avoided that the pressing portion presses a part of the connection terminal other than the pressure receiving portion.

(4) Preferably, the connection terminal of the card edge connector of the present disclosure is formed with a recess, the pressing portion being insertable into the recess in a state where mounting of the connection terminal into the housing is completed. According to this configuration, whether or not the mounting of the connection terminal into the housing has been completed can be understood based on whether or not the pressing portion can be inserted into the recess when the pressing portion of the pressure holding member is inserted into the recess.

(5) Preferably, the receptacle of the card edge connector of the present disclosure is made of metal, the pressure holding member is made of ceramic, and the pressure holding member contacts the receptacle due to a reaction force of the pressure receiving portion. According to this configuration, since the receptacle and the pressure holding member press the pressure receiving portion without via a synthetic resin, it is possible to suppress a reduction in force for pressing the pressure receiving portion due to heat and the like.

Details of Embodiment of Present Disclosure

Embodiment

One specific embodiment of a card edge connector of the present disclosure is described with reference to FIGS. 1 to 10. Note that, in the following description, left and right sides in FIG. 2 are defined as front and rear sides concerning a front-rear direction. Upper and lower sides shown in FIG. 2 are directly defined as upper and lower sides concerning a vertical direction. Back and frontal sides in FIG. 2 are defined as left and right sides concerning a lateral direction.

Figure 2:
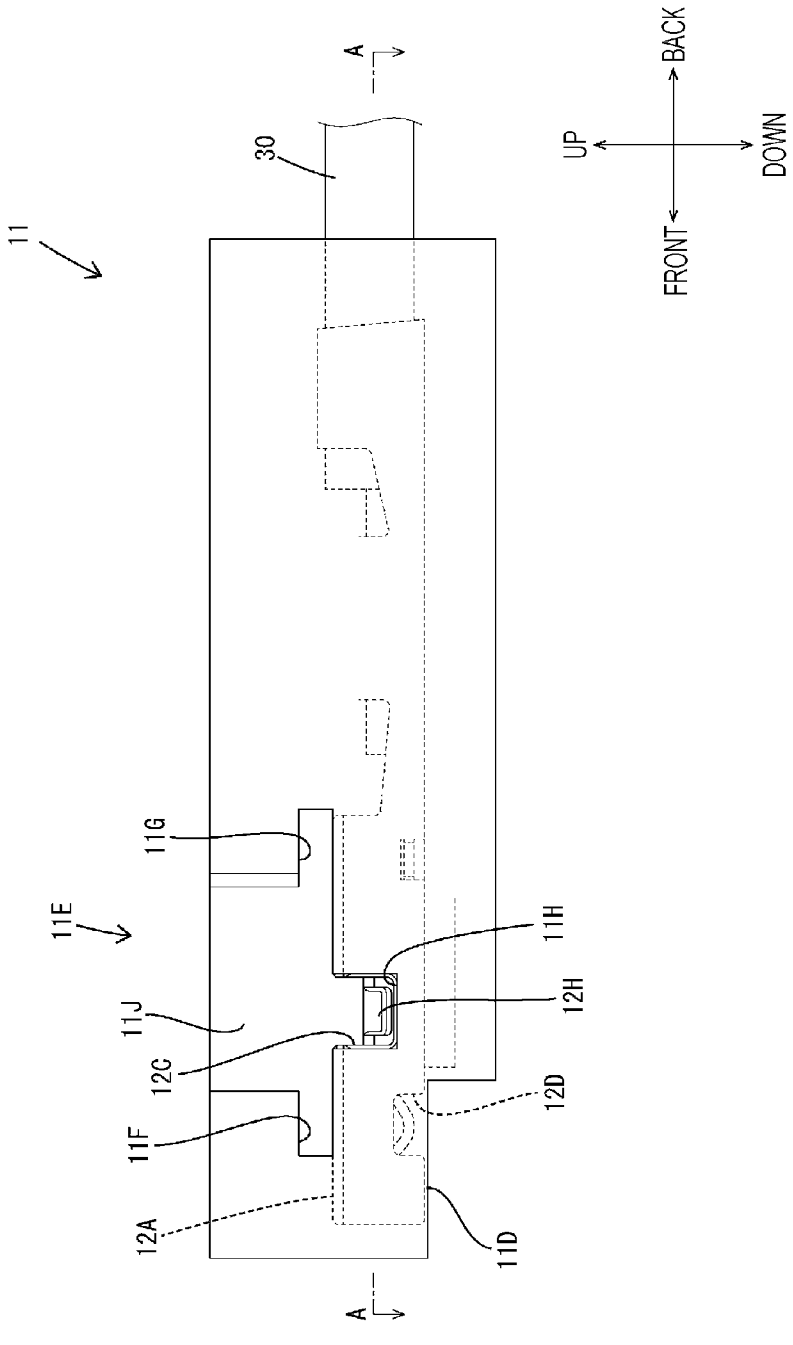
FIG. 2 is a side view of a housing mounted with connection terminals.

As shown in FIG. 1, a card edge connector 1 is provided with a receptacle 10, a housing 11, connection terminals 12 and a pressure holding member 13. The receptacle 10 is in the form of a box made of metal and having open rear and lower ends. The receptacle 10 includes laterally bent portions 10A bent laterally outward from the lower ends of left and right side walls and forwardly bent portions 10B bent forwardly from the lower end of a front wall. The upper wall of the receptacle 10 is formed with a pair of cam grooves 10C. A rear end part 10C of each cam groove 10C extends forward and a part of each cam groove 10C forward of the rear end part 10D is an inclined portion 10E, which is a slope obliquely extending to a front-left side.

The laterally bent portions 10A and the forwardly bent portions 10B of the receptacle 10 are fixed to the upper surface of a circuit board S by solder. A rear part of the receptacle 10 projects further rearward than the rear end of the circuit board S. In this way, the receptacle 10 is mounted on an end part of the circuit board S. A circuit pattern is formed at least on the upper surface of the circuit board S. The circuit pattern is formed also in a region covered by the receptacle 10 on the upper surface of the circuit board S, thereby forming a contact surface P with which the connection terminals 12 to be described later are electrically brought into contact. The contact surface P is a part of the surface of the circuit board S.

Figure 3:
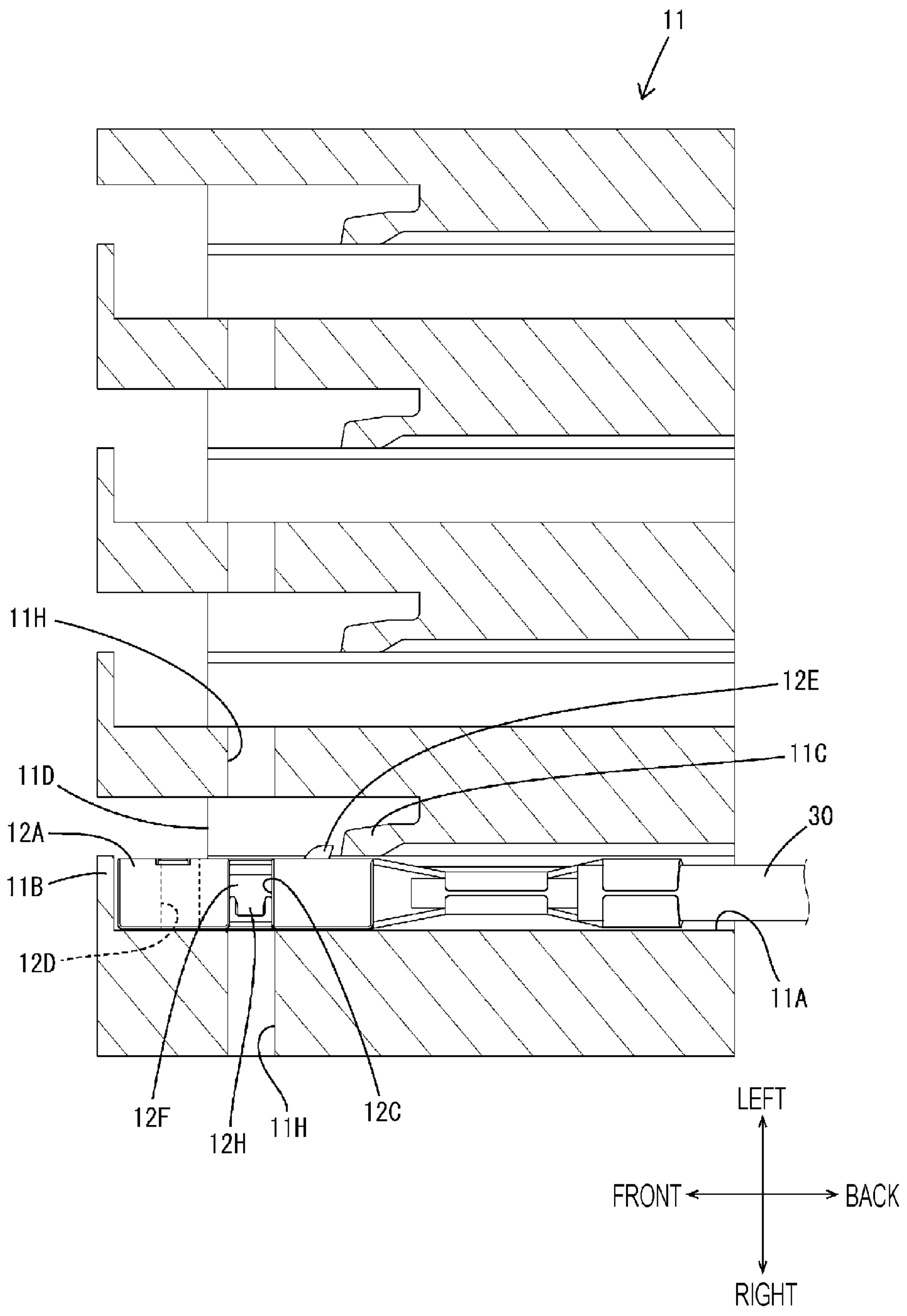
FIG. 3 is a section along A-A in FIG. 2.

The housing 11 is made of synthetic resin and in the form of a block as a whole. As shown in FIG. 3, a plurality of cavities 11A extending in the front-rear direction are formed laterally side by side in the housing 11. The rear end of each cavity 11A is open rearward. The front end of each cavity 11A is closed on front by a front end wall 11B. To the left of each cavity 11A, a locking lance 11C resiliently deformable in the lateral direction is provided adjacent to the cavity 11A.

As shown in FIG. 2, a lower side of a rear end part of the housing 11 is cut to form a board accommodating portion 11D. The board accommodating portion 11D communicates with a lower side of a front end part of each cavity 11A (see FIG. 3). A pressure holding member insertion groove 11E is formed on an upper side of the housing 11 in front of and near a central part in the front-rear direction.

As shown in FIG. 1, the pressure holding member insertion groove 11E is formed to extend in the lateral direction. Upper and right sides of the pressure holding member insertion groove 11E are open. The left end of the pressure holding member insertion groove 11E is closed by a left wall portion 11J. The pressure holding member insertion groove 11E communicates with an upper side of the front end part of each cavity 11A. The pressure holding member insertion groove 11E is formed with a front groove 11F, a rear groove 11G and a lower groove 11H.

The front groove 11F is formed by recessing a lower end part of the front end of the pressure holding member insertion groove 11E forward. The rear groove 11F is formed by recessing a lower end part of the front end of the pressure holding member insertion groove 11E forward. Dimensions of the front and rear grooves 11F, 11G in the vertical direction and lateral direction are equal. The lower groove 11H is formed in a central part in the front-rear direction of the pressure holding member insertion groove 11E by recessing the housing 11 downward at a position where the cavities 11A are not formed (see FIG. 3).

Figure 4:
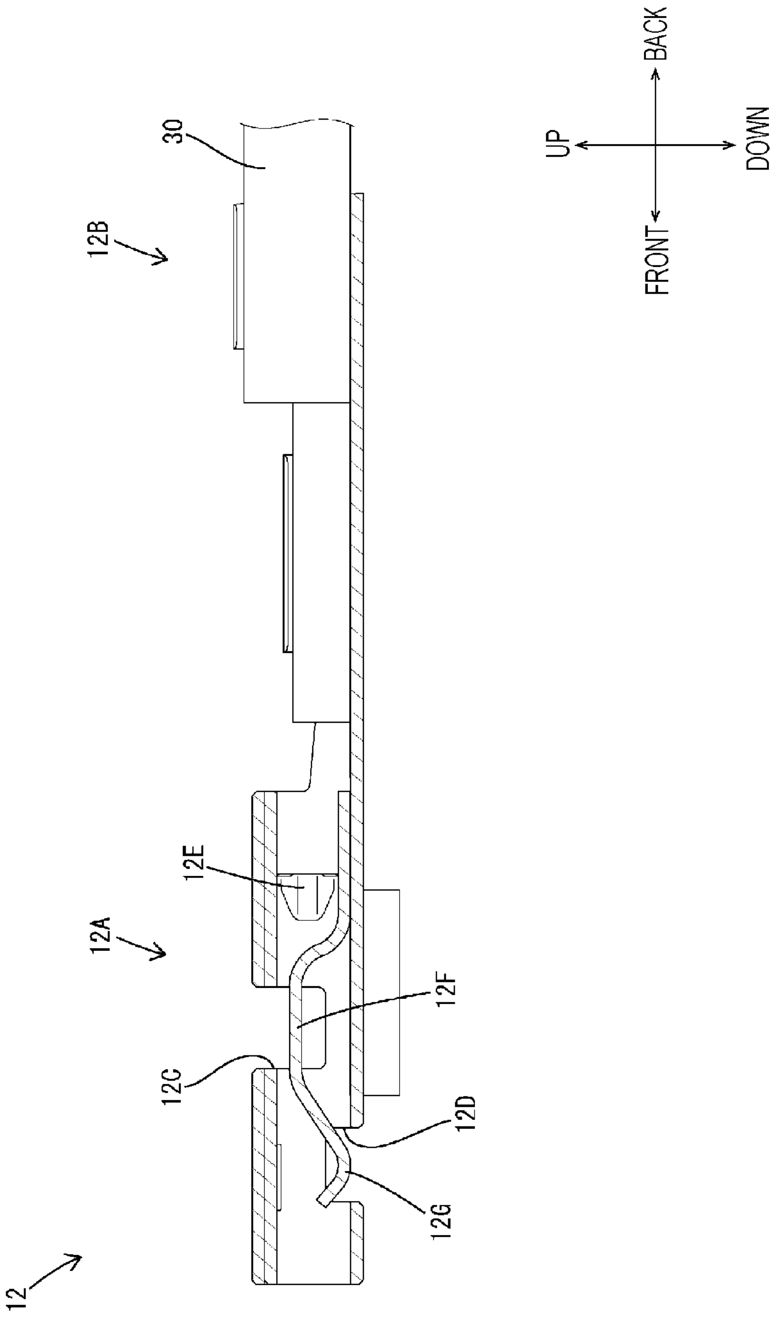
FIG. 4 is a side view in section of the connection terminal crimped to a coated wire.

The connection terminal 12 is formed by bending a metal plate material and has a shape elongated in the front-rear direction as a whole. As shown in FIG. 4, the connection terminal 12 includes a rectangular tube portion 12A in a front part and a crimping portion 12B in the form of an open barrel in a rear part. A first recess 12C, which is a recess formed by being recessed and cut downward, is formed on an upper side of a central part in the front-rear direction of the rectangular tube portion 12A. A second recess 12D, which is a recess formed by being recessed and cut upward, is formed on a lower side of a front end part of the rectangular tube portion 12A. A projection-like locking portion 12E projecting leftward is formed on the left surface of the front end part of the rectangular tube portion 12A (see FIG. 3). A lower plate portion constituting the rectangular tube portion 12A is connected to a base plate portion of the crimping portion 12B. The crimping portion 12B is electrically conductively crimped to a front end part of a coated wire 30.

A pressure receiving portion 12F and a resilient contact piece 12G are accommodated in the rectangular tube portion 12A. A rear part of the pressure receiving portion 12F is coupled along the lower plate portion of a rear end part of the rectangular tube portion 12A. A front part of the pressure receiving portion 12F is located in front of and above the rear part and extends in the front-rear direction. The rear end of the front part and the front end of the rear part of the pressure receiving portion 12F are coupled by a coupling portion inclined upward toward the front.

Figure 5:
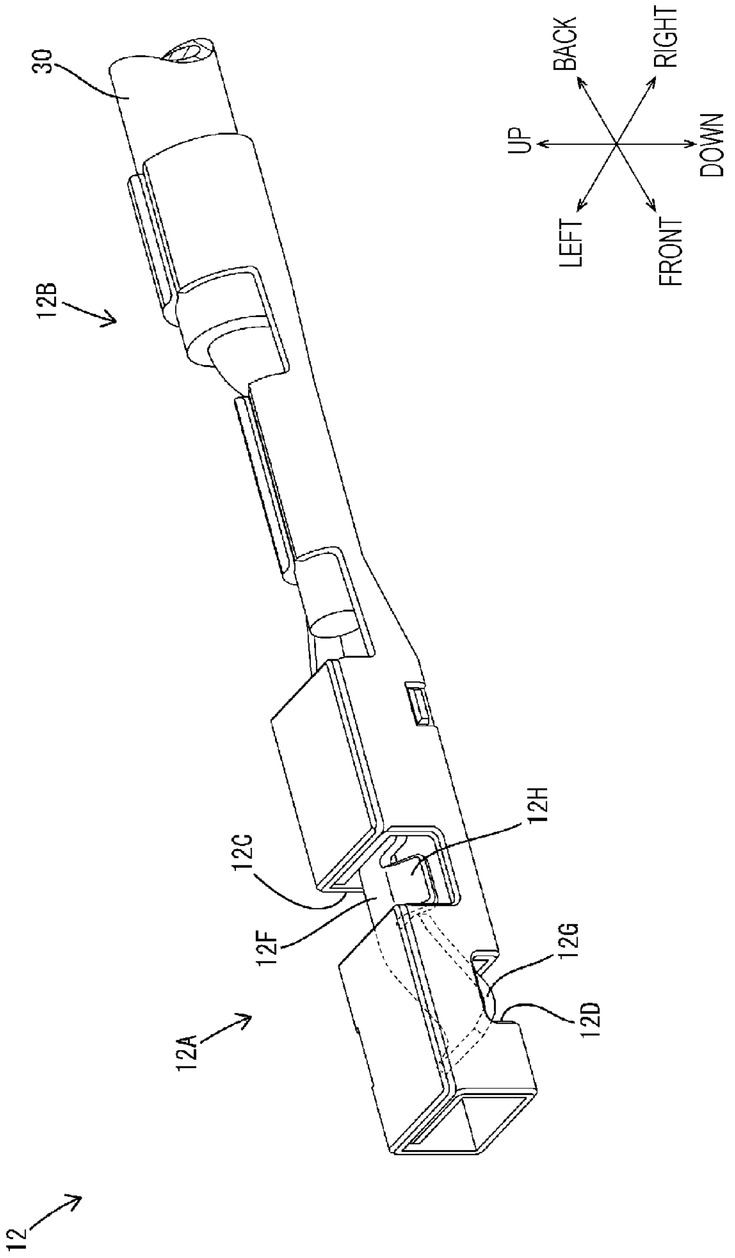
FIG. 5 is a perspective view of the connection terminal crimped to the coated wire when viewed obliquely from a front-upper side.

The front part of the pressure receiving portion 12F is provided with a catching portion 12H as shown in FIG. 5. The catching portion 12H is in the form of a flat plate and extends downward toward the right from the right end of the front part of the pressure receiving portion 12F. The right end of the catching portion 12H is located to the left of a right plate portion of the rectangular tube portion 12A. That is, the catching portion 12H is arranged in the rectangular tube portion 12A. The resilient contact piece 12G extends obliquely downward toward the front from the front end of the front part of the pressure receiving portion 12F.

As shown in FIG. 4, a front end part of the resilient contact piece 12G is bent upward toward the front. If a downward force is applied to the pressure receiving portion 12F via the first recess 12C, the pressure receiving portion 12F is displaced downward. Along with this, the front end part of the resilient contact piece 12G is displaced downward and projects further downward than the rectangular tube portion 12A via the second recess 12D of the rectangular tube portion 12A. In the connection terminal 12, the resilient contact piece 12G is arranged in the rectangular tube portion 12A unless a force is applied to the pressure receiving portion 12F.

The connection terminal 12 is mounted into the housing 11 by being inserted into the cavity 11A from behind the housing 11. The connection terminal 12 inserted to a proper position is held in a retained state by locking the locking portion 12E to the locking lance 11C as shown in FIG. 3. The coated wire 30 fixed to the connection terminal 12 is drawn out rearward from the housing 11. The front end of the rectangular tube portion 12A of the retained connection terminal 12 is facing and adjacent to the rear surface of the front end wall 11B located on the front end of the cavity 11A. The first recess 12C is arranged side by side with the lower groove 11H in a row in the lateral direction. The second recess 12D is facing the board accommodating portion 11D (see FIG. 2).

Figure 6:
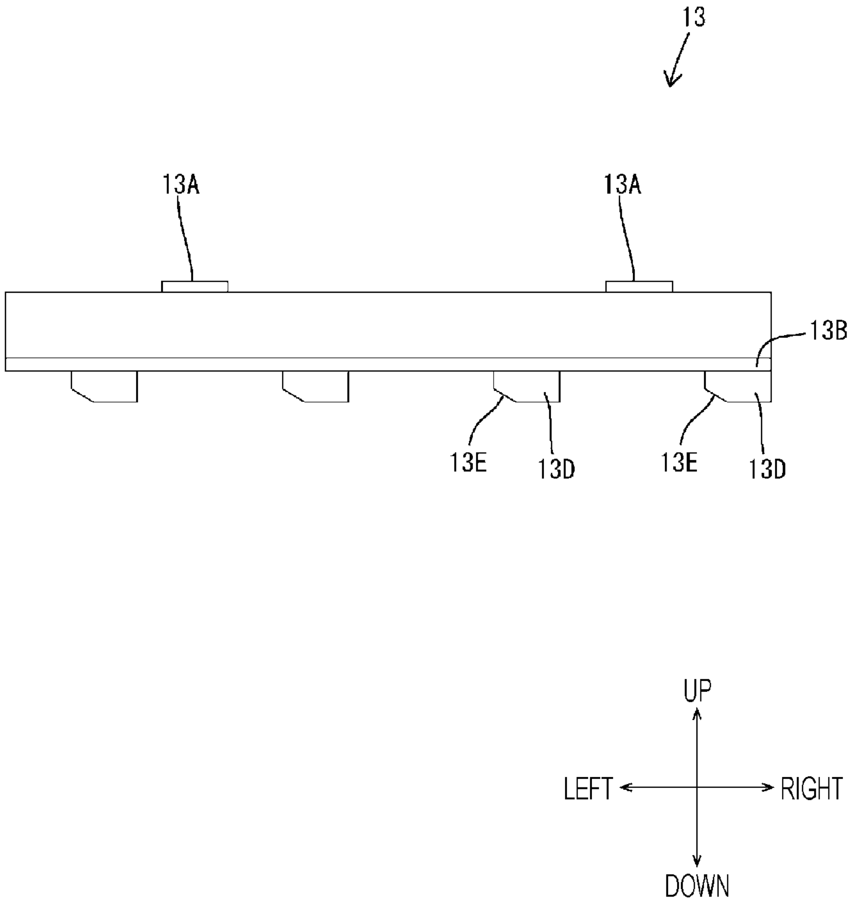
FIG. 6 is a side view of a pressure holding member viewed from front.

The pressure holding member 13 is made of ceramic and formed to extend in the lateral direction (see FIG. 1). As shown in FIG. 6, the pressure holding member 13 includes a pair of cam portions 13A, a front rib 13B, a rear rib 13C and a plurality of pressing portions 13D. The pair of cam portions 13A are in the form of cylinders projecting upward from the upper surface of the pressure holding member 13 and one cam portion 13A is provided on each of both end parts in the lateral direction of the pressure holding member 13 (see FIG. 1). The front rib 13B extends forward from the left end to right end of a lower end part of a front side of the pressure holding member 13. The rear rib 13C extends rearward from the left end to right end of a lower end part of a rear side of the pressure holding member 13 (see FIG. 1). The plurality of pressing portions 13D project downward from the lower surface of the pressure holding member 13 and are provided side by side in a row in the lateral direction. An inclined surface 13E inclined downward toward the right is formed on a tip part (lower end part) of the left end of each pressing portion 13D.

The pressure holding member 13 is mounted into the housing 11 by being inserted into the pressure holding member insertion groove 11E from the right of the housing 11 mounted with the connection terminals 12. The front and rear ribs 13B, 13C of the pressure holding member 13 are respectively inserted into the front groove 11E and the rear groove 11G of the pressure holding member insertion groove 11E from the right. The plurality of pressing portions 13D of the pressure holding member 13 are inserted into the lower groove 11H of the pressure holding member insertion groove 11E from the right.

At this time, the respective pressing portions 13D move in the lower groove 11H and the first recesses 12C leftward. When the pressing portion 13D moves leftward in the first recess 12C, the pressing portion 13D first contacts the catching portion 12H provided in the pressure receiving portion 12F. If the pressing portion 13D moves further leftward, the catching portion 12H and the pressure receiving portion 12F are pressed downward and displaced downward by the pressing portion 13D. In this way, the catching portion 12H properly catches the pressing portion 13D into the pressure receiving portion 12F. If the pressing portion 13D passes through the pressure receiving portion 12F in the leftward direction, the catching portion 12H and the pressure receiving portion 12F resiliently return. Then, the respective pressing portions 13D are arranged to the right of the catching portions 12H of the respective connection terminals 12. At this time, the left end of the pressure holding member 13 and the left wall portion 11J of the pressure holding member insertion groove 11E are separated by a predetermined distance.

Note that if the rectangular tube portion 12A of the connection terminal 12 is not facing and adjacent to the rear surface of the front end wall 11B located on the front end of the cavity 11A (i.e., the mounting of the connection terminal 12 is not completed), the first recess 12C is located behind the lower groove 11H and the outer surface of the rectangular tube portion 12A is located in the lower groove 11H. Thus, if the pressure holding member 13 is inserted into the pressure holding member insertion groove 11E in this case, the pressing portion 13D contacts the outer surface of the rectangular tube portion 12A located in the lower groove 11H and the insertion of the pressure holding member 13 into the pressure holding member insertion groove 11E is restricted. That is, the pressing portion 13D is not insertable into the first recess 12C until the mounting of the connection terminal 12 into the housing 11 is completed.

Subsequently, a procedure of fitting the housing 11 mounted with the connection terminals 12 and inserted with the pressure holding member 13 into the receptacle 10 is described.

Figure 7:
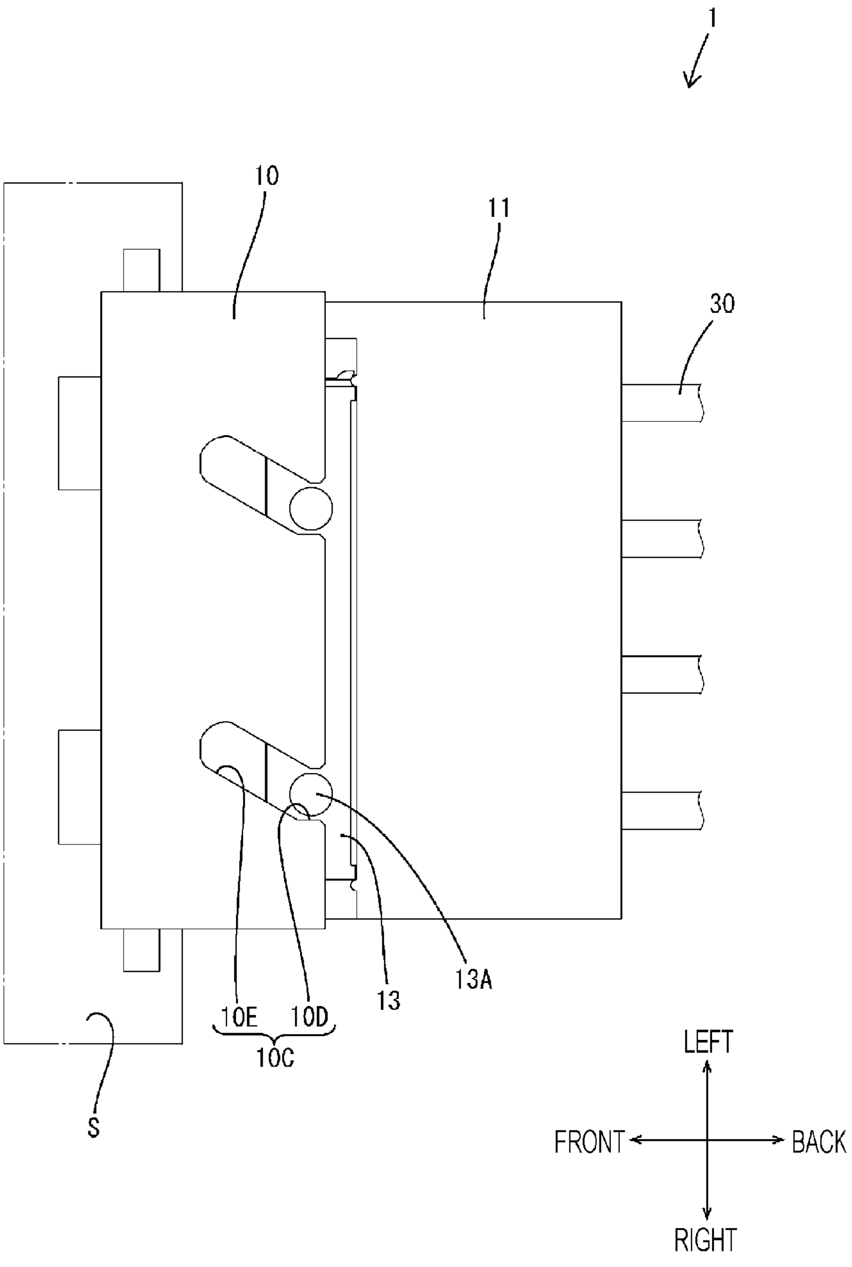
FIG. 7 is a plan view showing a state where the connection terminals crimped to the coated wires and the housing mounted with the pressure holding member are fit in a receptacle and cam portions are located at rear end parts of cam grooves.

First, the front end of the housing 11 is caused to face the rear end of the receptacle 10 and the housing 11 is caused to enter the receptacle 10 such that the upper surface of the housing 11 extends along the inner surface of the upper wall of the receptacle 10. Then, the pair of cam portions 13A of the pressure holding member 13 are fit into the rear end parts 10D of the pair of cam grooves 10C of the receptacle 10 as shown in FIG. 7. An entrance direction of the housing 11 into the receptacle 10 is a direction parallel to an inserting direction of the connection terminals 12 into the cavities 11A.

Figure 8:
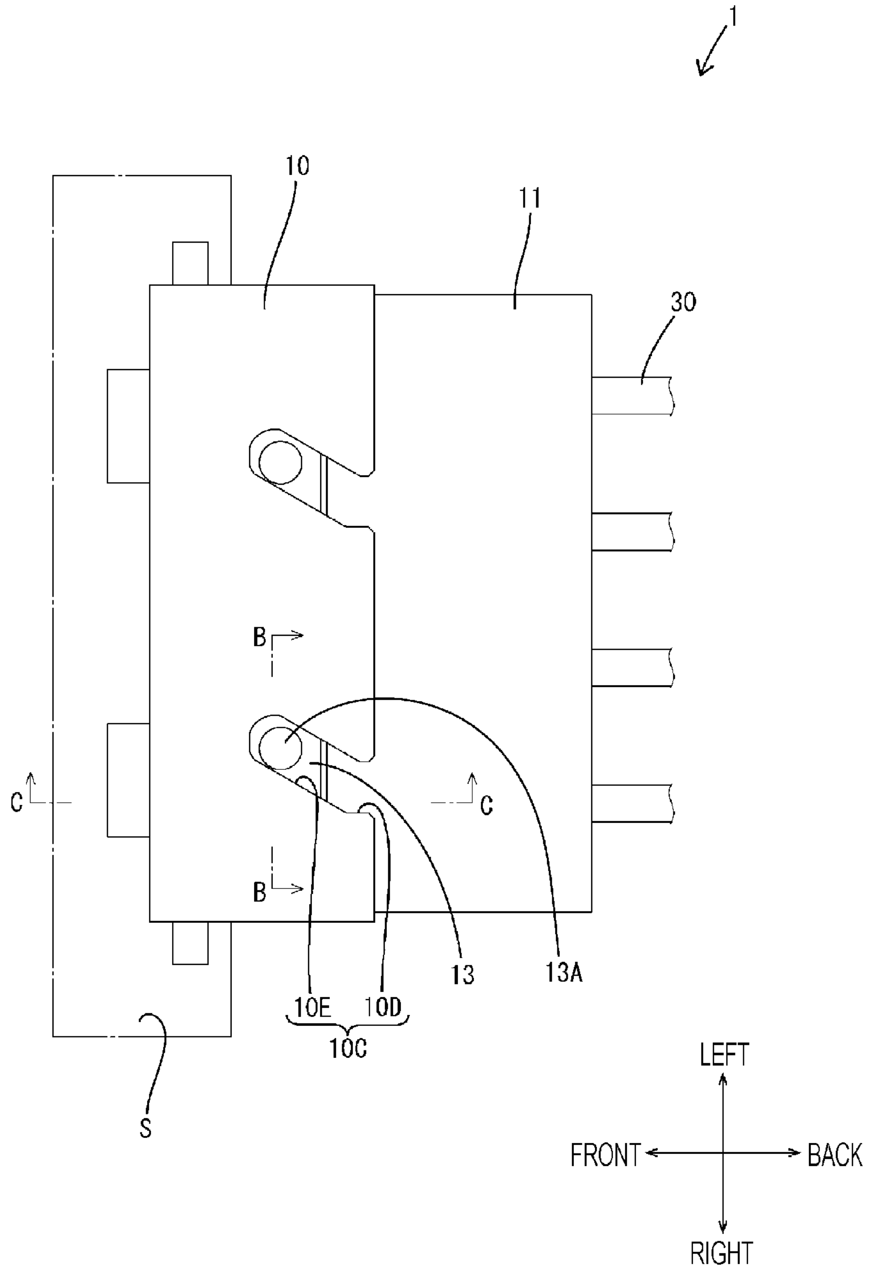
FIG. 8 is a plan view showing a state where the connection terminals crimped to the coated wires and the housing mounted with the pressure holding member are fit in the receptacle and the cam portions are located in inclined portions of the cam grooves.
Figure 9:
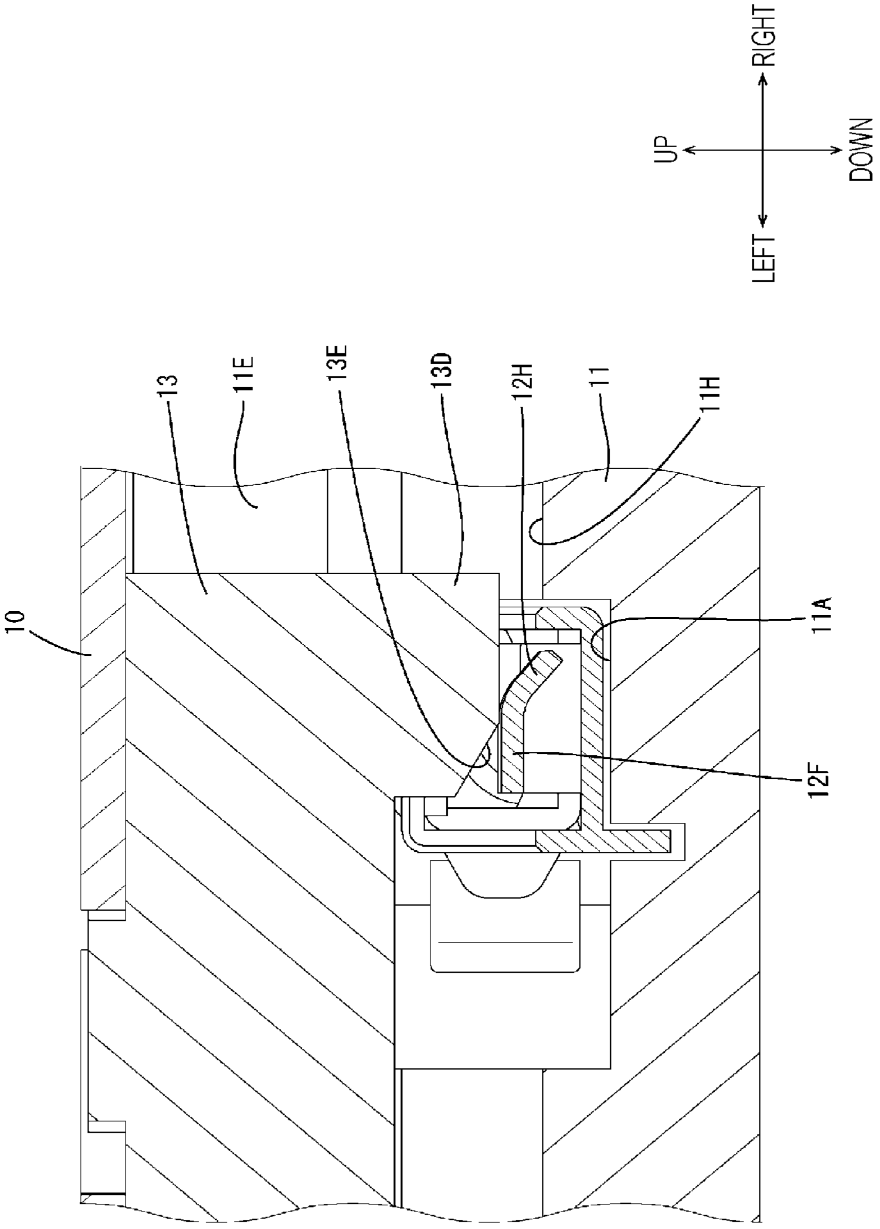
FIG. 9 is a section along B-B in FIG. 8.

The housing 11 is further inserted into the receptacle 10. Then, the respective cam portions 13A pass through the rear end parts 10D of the respective cam grooves 10C of the receptacle 10 forward, reach the inclined portions 10E and move along the inclined portions 10E of the cam grooves 10C as shown in FIG. 8. Associated with this time, the pressure holding member 13 moves leftward in the pressure holding member insertion groove 11E.

If the pressure holding member 13 moves leftward in the pressure holding member insertion groove 11E, the inclined surfaces 13E of the respective pressing portions 13E contact the catching portions 12H of the respective connection terminals 12 from the right. If the pressure holding member 13 moves further leftward in the pressure holding member insertion groove 11E, the respective catching portions 12H are pressed downward by the inclined surfaces 13E and displaced downward along the inclined surfaces 13E. Along with this, the pressure receiving portions 12F and the resilient contact pieces 12G are also displaced downward (i.e., toward the board accommodating portion 11D). That is, if the pressure holding member 13 moves along the inclined portions 10E as the housing 11 is fit into the receptacle 10, movement amounts (i.e., pressing strokes) of the pressing portions 13D for the catching portions 12H increase. The resilient contact pieces 12G are displaced toward the board accommodating portion 11D, into which the circuit board S is accommodated, as the movement amounts (i.e., pressing strokes) of the pressing portions 13D increase.

Figure 10:
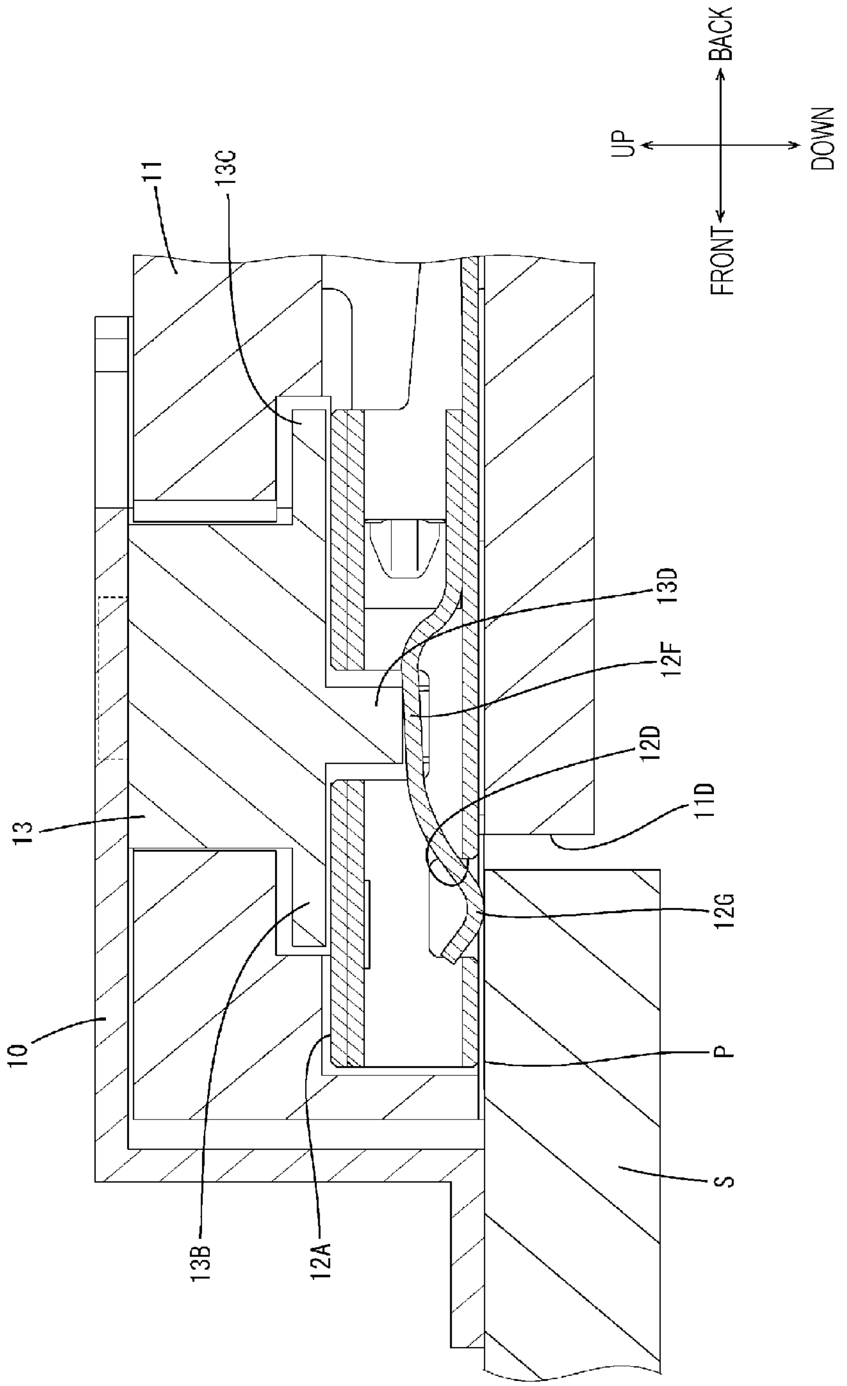
FIG. 10 is a section along C-C in FIG. 8.

The housing 11 is further inserted into the receptacle 10, the board accommodating portion 11D of the housing 11 reaches the upper surface of the circuit board S and the rear ends of the second recesses 12D of the connection terminals 12 approach the upper surface of the circuit board S. That is, the circuit board S is accommodated in the board accommodating portion 11D. At this time, the pressure receiving portions 12F are pressed by the pressing portions 13D (see FIG. 9). In this way, tip parts of the resilient contact pieces 12G displaced in a direction toward the surface of the circuit board S electrically contact the contact surface P while pressing the contact surface P of the circuit board S accommodated in the board accommodating portion 11D as shown in FIG. 10.

The front end surface of the housing 11 is facing and adjacent to the inner surface of the front wall of the receptacle 10, and the housing 11 and the receptacle 10 are fit. At this time, reaction forces of the pressure receiving portions 12F are applied upward to the pressure holding member 13. Thus, the upper surface of the pressure holding member 13 is in contact with the inner surface of the upper wall of the receptacle 10 (see FIG. 10). The receptacle 10 receives the reaction forces of the pressure receiving portions 12F by the contact of the upper surface of the pressure holding member 13 with the inner surface of the upper wall of the receptacle 10. At this time, the front and rear ribs 13B, 13C of the pressure holding member 13 are not in contact with the housing 11 (see FIG. 10).

Next, functions and effects of this embodiment are described.

The card edge connector 1 of the present disclosure is provided with the housing 11, the receptacle 10 to be mounted on the end part of the circuit board S and fit to the housing 11, the connection terminals 12 each including the resilient contact piece 12G to be brought into contact with the surface of the circuit board S and the pressure receiving portion 12F for displacing the resilient contact piece 12G in the direction toward the surface of the circuit board S by being pressed, the connection terminals 12 being mounted in the housing 11, and the pressure holding member 13 to be mounted into the housing 11 and including the pressing portions 13D for pressing the pressure receiving portions 12F. The receptacle 10 includes the inclined portions 10E, along which the pressure holding member 13 is displaced to increase the pressing strokes of the pressing portions 13D for the pressure receiving portions 12F as the housing 11 is further fit into the receptacle 10. The resilient contact pieces 12G are displaced toward the board accommodating portion 11D for accommodating the circuit board S and contact the surface of the circuit board S while pressing the surface of the circuit board S accommodated in the board accommodating portion 11D as the pressing strokes increase.

According to this configuration, since the resilient contact pieces 12G are displaced toward the board accommodating portion 11D in fitting the housing 11 into the receptacle 10, it is possible to prevent the collision of the inserting end part of the circuit board S with the resilient contact pieces 12G when the circuit board S is inserted into the board accommodating portion 11D. In this way, the deformation of the resilient contact pieces 12G can be prevented.

The inclined portions 10E of the card edge connector 1 of the present disclosure constitute the cam grooves 10C, and the pressure holding member 13 includes the cam portions 13 configured to be fit into the cam grooves 10C and move along the cam grooves 10C. According to this configuration, the pressure holding member 13 can be moved along the inclined portions 10E by a simple structure.

The pressure receiving portion 12F of the card edge connector 1 of the present disclosure is formed with the catching portion 12H for catching the pressing portion 13D. According to this configuration, since the pressing portion 13D can be caught by the catching portion 12H, it can be avoided that the pressing portion 13D presses a part of the connection terminal 12 other than the pressure receiving portion 12F.

The connection terminal 12 of the card edge connector 1 of the present disclosure is formed with the first recess 12C, into which the pressing portion 13D is insertable in the state where the mounting of the connection terminal 12 into the housing 11 is completed. According to this configuration, whether or not the mounting of the connection terminal 12 into the housing 11 has been completed can be understood based on whether or not the pressing portion 13D can be inserted into the first recess 12C when the pressing portion 13D of the pressure holding member 13 is inserted into the first recess 12C.

The receptacle 10 of the card edge connector 1 of the present disclosure is made of metal, the pressure holding member 13 is made of ceramic, and the pressure holding member 13 contacts the receptacle 10 due to reaction forces of the pressure receiving portions 12F. According to this configuration, since the receptacle 10 and the pressure holding member 13 press the pressure receiving portions 12F without via a synthetic resin, it is possible to suppress a reduction in force for pressing the pressure receiving portions 12F due to heat and the like.

Other Embodiments

The present disclosure is not limited to the above described and illustrated embodiment, but is represented by claims. The present disclosure is intended to include all changes in the scope of claims and in the meaning and scope of equivalents and also include the following embodiments.

(1) In the above embodiment, the front end parts of the resilient contact pieces are electrically in contact with the contact surface formed on the upper surface of the circuit board. Without limitation to this, contact surfaces may be formed on both upper and lower surfaces of the circuit board, the receptacle may be provided to cover each of these contact surfaces, and the front end parts of the resilient contact pieces may be respectively brought into contact with these contact surfaces.

(2) In the above embodiment, the upper wall of the receptacle is formed with the cam grooves including the inclined portions obliquely extending to the front-left side. Without limitation to this, inclined portions inclined to a front-lower side may be formed in the lower surface of the upper wall of the receptacle and the pressure holding member may be moved downward along the inclined portions of the upper wall of the receptacle if the housing is inserted into the receptacle.

LIST OF REFERENCE NUMERALS

1 . . . card edge connector
10 . . . receptacle
10A . . . laterally bent portion
10B . . . forwardly bent portion
10C . . . cam groove
10D . . . rear end part
10E . . . inclined portion (slope)
11 . . . housing
11A . . . cavity
11B . . . front end wall
11C . . . locking lance
11D . . . board accommodating portion
11E . . . pressure holding member insertion groove
11F . . . front groove
11G . . . rear groove
11H . . . lower groove
12 . . . connection terminal
12A . . . rectangular tube portion
12B . . . crimping portion
12C . . . first recess (recess)
12D . . . second recess
12E . . . locking portion
12F . . . pressure receiving portion
12G . . . resilient contact piece
12H . . . catching portion
13 . . . pressure holding member
13A . . . cam portion
13B . . . front rib
13C . . . rear rib
13D . . . pressing portion
13E . . . inclined surface
30 . . . coated wire
P . . . contact surface
S . . . circuit board

What is claimed is:

1. A card edge connector, comprising:
a housing;
a receptacle to be mounted on an end part of a circuit board, the receptacle being fit to the housing;
a connection terminal including a resilient contact piece to be brought into contact with a surface of the circuit board and a pressure receiving portion for displacing the resilient contact piece in a direction toward the surface of the circuit board by being pressed, the connection terminal being mounted in the housing; and
a pressure holding member to be mounted into the housing, the pressure holding member including a pressing portion for pressing the pressure receiving portion,
the receptacle including a slope, the pressure holding member being displaced along the slope to increase a pressing stroke of the pressing portion for the pressure receiving portion as the housing is further fit into the receptacle, and
the resilient contact piece being displaced toward a board accommodating portion for accommodating the circuit board and contacting the surface of the circuit board accommodated in the board accommodating portion while pressing the surface of the circuit board as the pressing stroke increases,
wherein the pressure receiving portion is provided with a catching portion for catching the pressing portion.

2. The card edge connector of claim 1, wherein:
the slope is a cam groove, and
the pressure holding member includes a cam portion configured to be fit into the cam groove and move along the cam groove.

3. A card edge connector, comprising:
a housing;
a receptacle to be mounted on an end part of a circuit board, the receptacle being fit to the housing;
a connection terminal including a resilient contact piece to be brought into contact with a surface of the circuit board and a pressure receiving portion for displacing the resilient contact piece in a direction toward the surface of the circuit board by being pressed, the connection terminal being mounted in the housing; and
a pressure holding member to be mounted into the housing, the pressure holding member including a pressing portion for pressing the pressure receiving portion,
the receptacle including a slope, the pressure holding member being displaced along the slope to increase a pressing stroke of the pressing portion for the pressure receiving portion as the housing is further fit into the receptacle, and
the resilient contact piece being displaced toward a board accommodating portion for accommodating the circuit board and contacting the surface of the circuit board accommodated in the board accommodating portion while pressing the surface of the circuit board as the pressing stroke increases,
wherein the connection terminal is formed with a recess, the pressing portion being insertable into the recess in a state where mounting of the connection terminal into the housing is completed.

4. The card edge connector of claim 3, wherein:
the slope is a cam groove, and
the pressure holding member includes a cam portion configured to be fit into the cam groove and move along the cam groove.

5. A card edge connector, comprising:
a housing;
a receptacle to be mounted on an end part of a circuit board, the receptacle being fit to the housing;
a connection terminal including a resilient contact piece to be brought into contact with a surface of the circuit board and a pressure receiving portion for displacing the resilient contact piece in a direction toward the surface of the circuit board by being pressed, the connection terminal being mounted in the housing; and
a pressure holding member to be mounted into the housing, the pressure holding member including a pressing portion for pressing the pressure receiving portion,
the receptacle including a slope, the pressure holding member being displaced along the slope to increase a pressing stroke of the pressing portion for the pressure receiving portion as the housing is further fit into the receptacle, and the resilient contact piece being displaced toward a board accommodating portion for accommodating the circuit board and contacting the surface of the circuit board accommodated in the board accommodating portion while pressing the surface of the circuit board as the pressing stroke increases, wherein:

the receptacle is made of metal, the pressure holding member is made of ceramic, and the pressure holding member contacts the receptacle due to a reaction force of the pressure receiving portion.

6. The card edge connector of claim 5, wherein:

the slope is a cam groove, and the pressure holding member includes a cam portion configured to be fit into the cam groove and move along the cam groove.

* * * * *